United States Patent
Ouyang et al.

(10) Patent No.: US 11,763,849 B1
(45) Date of Patent: Sep. 19, 2023

(54) AUTOMATIC AND FAST GENERATION OF MUSIC AUDIO CONTENT FOR VIDEOS

(71) Applicant: Lemon Inc., Grand Cayman (KY)

(72) Inventors: Zhihao Ouyang, Los Angeles, CA (US); Daiyu Zhang, Los Angeles, CA (US); Bochen Li, Los Angeles, CA (US); Baoman Liu, Los Angeles, CA (US); Liuqing Yang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 0 days.

(21) Appl. No.: 17/815,402

(22) Filed: Jul. 27, 2022

(51) Int. Cl.
*G11B 27/031* (2006.01)
*G06V 20/40* (2022.01)

(52) U.S. Cl.
CPC ............ *G11B 27/031* (2013.01); *G06V 20/46* (2022.01)

(58) Field of Classification Search
CPC ............................... G11B 27/031; G06V 20/46
USPC ......................................................... 386/285
See application file for complete search history.

(56) References Cited

U.S. PATENT DOCUMENTS

| | | | | |
|---|---|---|---|---|
| 2013/0192445 | A1* | 8/2013 | Sumi .................. | G10H 1/0008 84/609 |
| 2021/0049990 | A1* | 2/2021 | Medeot ................ | G10H 1/0025 |

FOREIGN PATENT DOCUMENTS

CN 113889059 A * 1/2022

OTHER PUBLICATIONS

17815402_Sep. 28, 2022_WO_2022083148_A1_H (Year: 2022).*
English Translation of Chinese Publication CN 113889059 (Year: 2022).*
Di et al.; "Video Background Music Generation with Controllable Music Transformer"; Proceedings of the 29th ACM Int'l Conf. on Multimedia; 2021; p. 2037-2045.

* cited by examiner

*Primary Examiner* — Loi H Tran
(74) *Attorney, Agent, or Firm* — BakerHostetler

(57) ABSTRACT

The present disclosure describes techniques for automatically and fast generating music for videos. The techniques comprise receiving a video from a user. The video may comprise a plurality of segments of frames. Information may be extracted from the video, wherein the extracted information comprises information indicating motion speed in the video, information indicating motion saliency in the video, information indicating scene transition in the video, and timing information associated with the video. A plurality of sets of music notes matching the plurality of segments of frames may be generated based at least in part on the extracted information. A plurality of vectors corresponding to the plurality of sets of music notes may be generated. The plurality of pieces of music audio corresponding to the plurality of segments of frames may be generated based at least in part on the plurality of vectors.

17 Claims, 11 Drawing Sheets

US 11,763,849 B1

AUTOMATIC AND FAST GENERATION OF MUSIC AUDIO CONTENT FOR VIDEOS

BACKGROUND

Communication is increasingly being conducted using Internet-based tools. The Internet-based tools may be any software or platform. Existing social media platforms enable users to communicate with each other by sharing images, videos, and other information via static app or web pages. As communication devices, such as mobile phones, become more sophisticated, people continue to desire new ways for entertainment, social networking, and communication.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Users of content creation platforms may have difficulty selecting music to be featured in their content. For example, a user of a content creation platform may be creating a video to be shared on the content creation platform. However, the user may find it difficult to select an appropriate song to be played in the video. For example, the user may need to keep reshooting clips of the video to match the beats and/or style of a selected song chosen. This process may be frustrating, inefficient, and time-consuming. Additionally, it may be difficult for the user to find a song that matches the length of the video. For example, the user may be creating a ten-minute video, and may have difficulty finding a song for the video that lasts at least ten minutes. For content creators that are business-oriented (i.e., creating content to promote a business), it may be difficult to find high-quality music that does not violate region-specific music licensing agreements. Alternatively, content creators may attempt to create their own music to accompany their videos. However, creators who do not have professional equipment may feel discouraged from trying to create music, or they may be unable to create high quality songs.

Accordingly, improvements in content creation techniques, in particular techniques for music generation, are desirable. Described here are techniques that enable efficient smart music generation and professional music editing. After a content creator creates a video, music or audio that matches the transitions, intensity, and motion in the video will be automatically generated. Such music or audio may be royalty-free and can be of any length.

Figure 1:
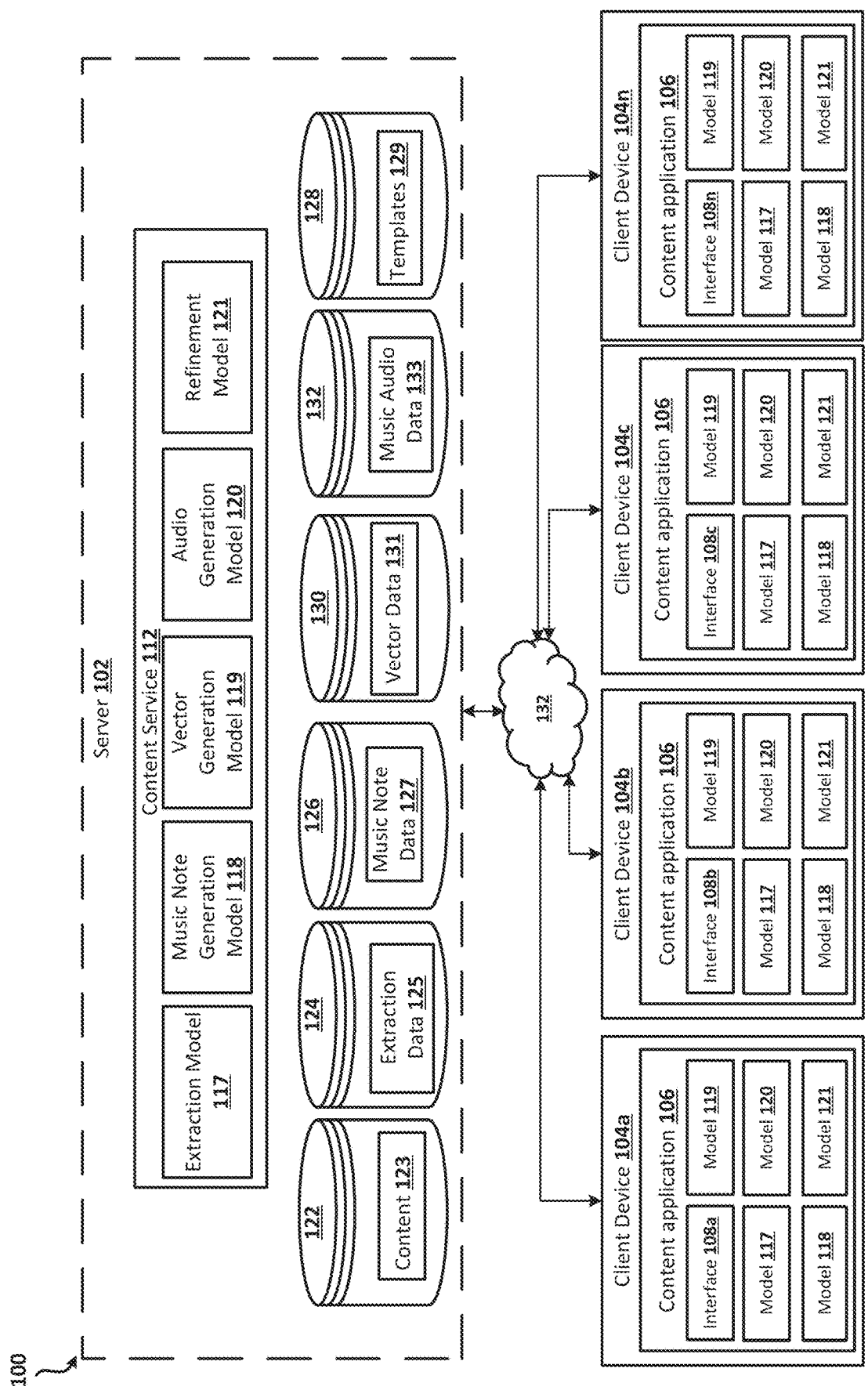
FIG. 1 shows an example system for distributing content in accordance with the present disclosure.

The music generation techniques described herein may be utilized by a system for distributing content. FIG. 1 illustrates an example system 100 for distributing content. The system 100 may comprise a server 102 and a plurality of client devices 104a-n. The server 102 and the plurality of client devices 104a-n may communicate with each other via one or more networks 132.

The server 102 may be located at a data center, such as a single premise, or be distributed throughout different geographic locations (e.g., at several premises). The server 102 may provide the services via the one or more networks 120. The network 132 comprise a variety of network devices, such as routers, switches, multiplexers, hubs, modems, bridges, repeaters, firewalls, proxy devices, and/or the like. The network 132 may comprise physical links, such as coaxial cable links, twisted pair cable links, fiber optic links, a combination thereof, and/or the like. The network 132 may comprise wireless links, such as cellular links, satellite links, Wi-Fi links and/or the like.

The server 102 may comprise a plurality of computing nodes that host a variety of services. In an embodiment, the nodes host a content service 112. The content service 112 may comprise a content streaming service, such as an Internet protocol video streaming service. The content service 112 may be configured to distribute content 123 via a variety of transmission techniques. The content service 112 is configured to provide the content 123, such as video, audio, textual data, a combination thereof, and/or the like. The content 123 may comprise content streams (e.g., video stream, audio stream, information stream), content files (e.g., video file, audio file, text file), and/or other data. The content 123 may be stored in a database 122. For example, the content service 112 may comprise a video sharing service, a video hosting platform, a content distribution platform, a collaborative gaming platform, and/or the like.

In an embodiment, the content 123 distributed or provided by the content service 112 comprises videos. The videos may have a duration less than or equal to a predetermined time limit, such as one minute, five minutes, or other predetermined minutes. By way of example and without limitation, the videos may comprise at least one, but no more than four, 15 second segments strung together. The short duration of the videos may provide viewers with quick bursts of entertainment that allow users to watch a large quantity of videos in a short time frame. Such quick bursts of entertainment may be popular on social media platforms.

The videos may comprise a pre-recorded audio overlay, such as a clip of a pre-recorded song or audio from a television show or movie. If a short video comprises a pre-recorded audio overlay, the short video may feature one or more individuals lip-syncing, dancing, or otherwise moving their body along with the pre-recorded audio. For example, a short video may feature an individual completing a "dance challenge" to a popular song or a short video may feature two individuals participating in a lip-syncing or dancing duet. As another example, a short video may feature an individual completing a challenge that requires them to move his or her body in a manner that corresponds to the pre-recorded audio overlay, such as in a manner that corresponds to the beat or rhythm of the pre-recorded song featured by the pre-recorded audio overlay. Other videos may not comprise a pre-recorded audio overlay. For example, these videos may feature an individual playing sports, pulling pranks, or giving advice, such as beauty and fashion advice, cooking tips, or home renovation tips.

In an embodiment, the content 123 may be output to different client devices 104 via the network 132. The content 123 may be streamed to the client devices 104. The content stream may be a stream of videos received from the content service 112. The plurality of client devices 104 may be configured to access the content 123 from the content service 112. In an embodiment, a client device 104 may comprise a content application 106. The content application 106 outputs (e.g., display, render, present) the content 123 to a user associated with the client device 104. The content may comprise videos, audio, comments, textual data and/or the like.

The plurality of client devices 104 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. The plurality of client devices 104 may be associated with one or more users. A single user may use one or more of the plurality of client devices 104 to access the server 102. The plurality of client devices 104 may travel to a variety of locations and use different networks to access the server 102.

The content service 112 may be configured to receive input from users. The users may be registered as users of the content service 112 and may be users of the content application 106 operating on client devices 104. The user inputs may include videos created by users, user comments associated with videos, or "likes" associated with videos. The user inputs may include connection requests and user input data, such as text data, digital image data, or user content. The connection requests may comprise requests from the client devices 104a-d to connect to the content service 112. The user input data may include information, such as videos and/or user comments, that the users connected to the content service 112 want to share with other connected users of the content service 112.

The content service 112 may be able to receive different types of input from users using different types of client devices 104. For example, a user using the content application 106 on a first user device, such as a mobile phone or tablet, may be able to create and upload videos using the content application 106. A user using the content application 106 on a different mobile phone or tablet may also be able to view, comment on, or "like" videos or comments written by other users. In another example, a user using the content application 106 on a smart television, laptop, desktop, or gaming device may not be able to create and upload videos or comment on videos using the content application 106. Instead, the user using the content application 106 on a smart television, laptop, desktop, or gaming device may only be able to use the content application 106 to view videos, view comments left by other users, and "like" videos.

In an embodiment, a user may use the content application 106 on a client device 104 to create a video, such as a short video, and upload the video to the server 102. The client devices 104 may access an interface 108 of the content application 106. The interface 108 may comprise an input element. For example, the input element may be configured to allow users to create the video. To create the short video, the user may give the content application 106 permission to access an image capture device, such as a camera, or a microphone of the client device 104. Using the content application 106, the user may select a duration for the video or set a speed for the video, such as "slow-motion" or "speed things up."

The user may edit the video using the content application 106. The user may add one or more texts, filters, sounds, or effects, such as beauty effects, to the video. To add a pre-recorded audio overlay to the video, the user may select a song or sound clip from a sound library of the content application 106. The sound library may include different songs, sound effects, or audio clips from movies, albums, and television shows. In addition to or in lieu of adding a pre-recorded audio overlay to the video, the user may use the content application 106 to add a voice-over to the video. The voice-over may be a sound recorded by the user using a microphone of the client device 104. The user can add a text overlay to the short video and may use the content application 106 to specify when they want the text overlay to appear in the video. The user may assign a caption, location tag, and one or more hashtags to the video to indicate the subject matter of the video. The content application 106 may prompt the user to select a frame of the video to use as a "cover image" for the video.

After the user has created the video, the user may use the content application 106 to upload the video to the server 102 and/or to save the video locally to the user device 104. When a user uploads the video to the server 102, they may choose whether they want the video to be viewable by all other users of the content application 106 or viewable by only a subset of the users of the content application 106. The content service 112 may store the uploaded videos and any metadata associated with the videos in one or more databases 122.

In an embodiment, a user may use the content application 106 on a client device 104 to provide input on a video. The client devices 104 may access an interface 108 of the content application 106 that allows users to provide input associated with videos. The interface 106 may comprise an input element. For example, the input element may be configured to receive input from a user, such as comments or "likes" associated with a particular video. If the input is a comment, the content application 106 may allow a user to set an emoji associated with his or her input. The content application 106 may determine timing information for the input, such as when a user wrote a comment. The content application 106 may send the input and associated metadata to the server 102. For example, the content application 106 may send a comment, an identifier of the user that wrote the comment, and the timing information for the comment to the server 102. The content service 112 may store the input and associated metadata in the database(s) 122.

The content service 112 may be configured to output the uploaded videos and user input to other users. The users may be registered as users of the content service 112 to view videos created by other users. The users may be users of the content application 106 operating on client devices 104. The content application 106 may output (display, render, present) the videos and user comments to a user associated with a client device 104. The client devices 104 may access an interface 108 of the content application 106. The interface 108 may comprise an output element. The output element may be configured to display information about different videos so that a user can select a video to view. For example, the output element may be configured to display a plurality of cover images, captions, or hashtags associated with the videos. The output element may also be configured to arrange the videos according to a category associated with each video.

In an embodiment, the user comments associated with a video may be output to other users watching the same video. For example, all users accessing a video may view comments associated with the video. The content service 112 may output the video and the associated comments simultaneously. Comments may be output by the content service 112 in real-time or near-real-time. The content application 106 may display the videos and comments in various ways on the client device 104. For example, the comments may be displayed in an overlay above the content or in an overlay beside the content. As another example, a user that wants to view other users' comments associated with a video may need to select a button in order to view the comments. The comments may be animated when displayed. For example, the comments may be shown scrolling across the video or across the overlay.

As discussed above, a user may use the content application 106 on a client device 104 to create a video and upload the video to the server 102. In an embodiment, the video created by the user via the content application 106 on the client device 104 may be a video that does not comprise a pre-recorded audio overlay, such as a clip of a pre-recorded song or audio from a television show or movie. Instead, music may be automatically generated for the video after the user has created the video. For example, music audio may be automatically generated for the video locally on the client device 104 after the user has created the video but before the user has uploaded the video to the server 102. Additionally, or alternatively, music audio may be automatically generated for the video by the content service 112 after the user has uploaded the video to the server 102. The music audio may be generated, for example, using an extraction model 117, a music note generation model 118, a vector generation model 119, an audio generation model 120, and/or a refinement model 121.

In an embodiment, at least one of the content service 112 or the client devices 104 comprise the extraction model 117. The extraction model 117 may be utilized, at least in part, to retrieve (e.g., determine, extract, etc.) information from videos created by users. For example, the extraction model 117 may be utilized to extract information associated with the video motion speed, the video motion saliency (i.e., the conspicuous state of an object in a video), scene transitions, and/or the timing of the video. For example, if a video depicts a man walking, the extraction model 117 may be utilized to extract information associated with how fast that man is walking, if/when he stops, etc. The information extracted from the user-created videos by the extraction model 117 may, for example, be stored in a database 124 as extraction data 125.

Figure 2:
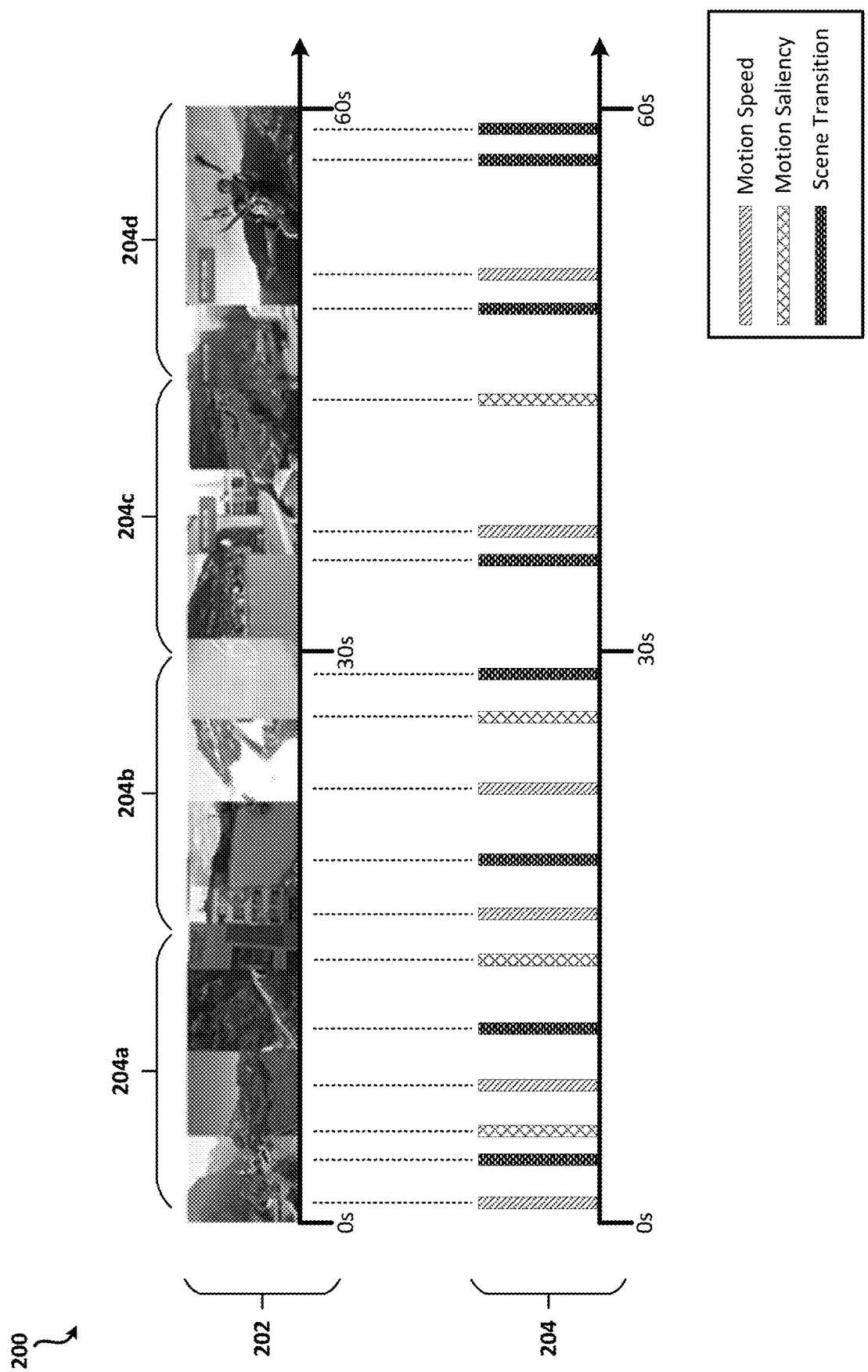
FIG. 2 shows an example diagram depicting information being extracted from a video in accordance with the present disclosure.

FIG. 2 illustrates an example diagram 200 depicting information being extracted from a video 202. The video 202 may comprise a plurality of segments 204a-d. Each of the segments 204a-d may include one or more video frames from the video 202. The extraction model 117 may extract from the entire video 202 (e.g., from all of the segments 204a-d), information associated with the video motion speed in the video 202. The extraction model 117 may additionally extract from the video 202, information associated with the video motion saliency in the video 202. The extraction model 117 may additionally extract from the video 202, information associated with the scene transitions in the video 202. The extraction model 117 may additionally extract from the video 202, information associated with the timing in the video 202. For example, the extraction model 117 may determine, for each item of information extracted from the video 202, at what time during the video 202 that the information was extracted. For example, if the video 202 has a duration of 60 seconds, the extraction model 117 may extract an item of information associated with the video motion saliency, video motion speed, and/or scene transition at a particular time, such as at 30 seconds. The timing information associated with this item of information may indicate that it was extracted from the video 202 at the 30-second mark. Collectively, the extracted information associated with the video motion speed, video motion saliency, scene transitions, and/or timing, may be referred to as extracted information 204. The extracted information 204 may, for example, be stored in the database 124 as extraction data 125.

Referring back to FIG. 1, in an embodiment, at least one of the content service 112 or the client devices 104 comprise the music note generation model 118. The music note generation model 118 may be utilized, at least in part, to automatically generate music notes corresponding to the extraction data 125. For example, the music note generation model 118 may utilize the information extracted from videos by the extraction model 117 to automatically generate, for each segment of a video, a set of music notes for the video. For example, the music note generation model 118 may utilize the information associated with a video's motion speed, motion saliency (i.e., the conspicuous state of an object in a video), scene transitions, and/or the timing to automatically generate music notes for the video.

In embodiments, to generate music notes for a video, the music note generation model 118 may retrieve from the database 124 the extraction data 125. The extraction data 125 may be fed into a trained model, such as a compound-word transformer model. The model may be pre-trained and may be configured to correlate video motion speed with music note density, correlate video motion saliency with music note strength, correlate video scene transition with music structure, and correlate video timing with music beat. For example, the model may receive, as input, the extraction data 125. The model may output music notes (e.g., sheet music) associated with a particular music note density, music note strength, music structure, and/or music beat. The generated music notes may, for example, be stored in a database 126 as generated music note data 127.

In embodiments, the model is a compound-word transformer model that is trained on a large quantity of midi files (e.g., 3000 midi files). Music generation may be made to be controllable by adding a parameter in the training process. A compound-word transformer model may utilize different feed-forward heads to model tokens of different types. The different types of tokens may include, for example, note types and metric types. With an expansion-compression trick, the compound-word transformer can convert a piece of music to a sequence of compound words by grouping neighboring tokens, greatly reducing the length of the token sequences.

Figure 3:
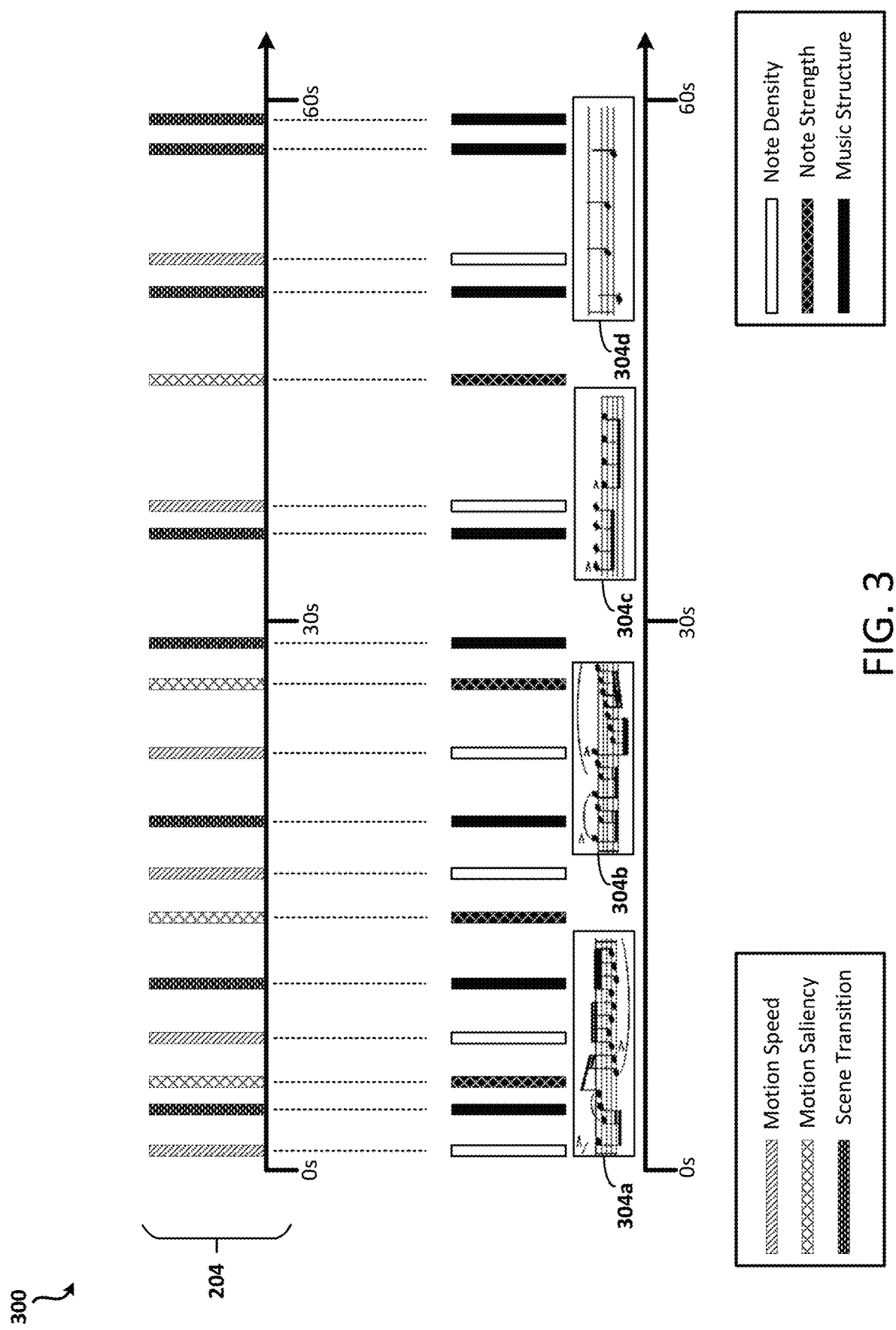
FIG. 3 shows an example diagram depicting music notes being generated based on information extracted from a video in accordance with the present disclosure.

FIG. 3 illustrates an example diagram 300 depicting music notes being generated based on the information extracted from a video. As described above with regard to FIG. 2, a video 202 may include one or more segments 204a-d of video frames. The extraction model 117 may extract from the video 202, information associated with the video motion speed, video motion saliency, scene transitions, and/or the timing in each of the segments 204a-d. Collectively, the extracted information associated with the video motion speed, video motion saliency, scene transitions, and/or timing, may be referred to as extracted information 204. The music note generation model 118 may generate music notes having a music note density that correlates to each item of extracted information associated with the video motion speed in the video 202. The music notes generated by the music note generation model 118 may additionally have a music note strength that correlates to each item of extracted information associated with the video motion saliency in the video 202. Additionally, the music notes generated by the music note generation model 118 may have a music structure that correlates to each item of extracted information associated with video scene transition in the video 202. Lastly, the music notes generated by the music note generation model 118 may have a music beat that correlates to each item of extracted information associated with video timing in the video 202. Collectively, the music notes having the corresponding music note density, music note strength, music structure, and/or music beat may be referred to as generated music notes.

In embodiments, the generated music notes may, for example, be divided into a plurality of sets 304a-d of music notes. Each of the sets 304a-d of music notes may correspond to one of the segments 204a-d of the video 202. For example, the set 304a of music notes may correspond to the segment 204a of the video 202, the set 304b of music notes may correspond to the segment 204b of the video 202, the set 304c of music notes may correspond to the segment 204c of the video 202, and the set 304d of music notes may correspond to the segment 204d of the video 202. The plurality of sets 304a-d of music notes may be stored in the database 126 as music note data 127.

Referring back to FIG. 1, in an embodiment, at least one of the content service 112 or the client devices 104 comprise a vector generation model 119. The vector generation model 119 may be utilized, at least in part, to automatically generate vectors corresponding to the music note data 127. For example, the vector generation model 119 may utilize the music note data 127 generated by the music note generation model 118 to automatically generate, for each of the plurality of sets 304a-d of music notes, a vector. Each vector may indicate at least one music feature of a piece of music audio associated with the corresponding set of music notes. For example, the at least one music feature may include a music style (e.g., music genre and/or mood), a bar structure, or a music instrument. A music genre may indicate whether the music audio associated with the corresponding set of music notes most closely resembles pop, rock, hip hop, country, etc. A music mood may indicate whether the music audio associated with the corresponding set of music notes has a particular energy (e.g., energetic, sad, slow, upbeat, etc.).

In embodiments, to generate the vectors, the vector generation model 119 may retrieve from the database 126 the music note data 127. The vector generation model 119 may be a trained model configured to determine music characteristics based on music notes. For example, the vector generation model 119 may receive, as input, the music note data 127. The vector generation model 119 may output vectors (e.g., one-dimensional rows of data or multidimensional vectors) indicative of music characteristics of the input music note data 127. The vectors may, for example, be in a format that is consumable by the audio generation model 120. The generated vectors may, for example, be stored in a database 130 as vector data 131.

In embodiments, a user may be able to specify one or more music preferences. Such preferences may be utilized by the vector generation model 119 when it is generating one or more vectors. For example, a user may indicate that he or she wants music that is upbeat to accompany a video. Thus, the user may specify this preference, and the vector generation model 119 may utilize the user-specified preferences in addition to or as an alternative to the plurality of sets 304a-d of music notes. The preferences may indicate, for example, a genre, a mood, a style, and/or one or more instruments that the user wants the generated music to reflect. The preferences may be in-line with or in conflict with the plurality of sets of music notes 304a-d. For example, a set of music notes may indicate a slow or sad energy. Nevertheless, the user may indicate that he or she wants music content for the video having a quick or happy energy. Thus, the vector may reflect the user-selected preferences instead of those indicated by the music notes.

Figure 4:
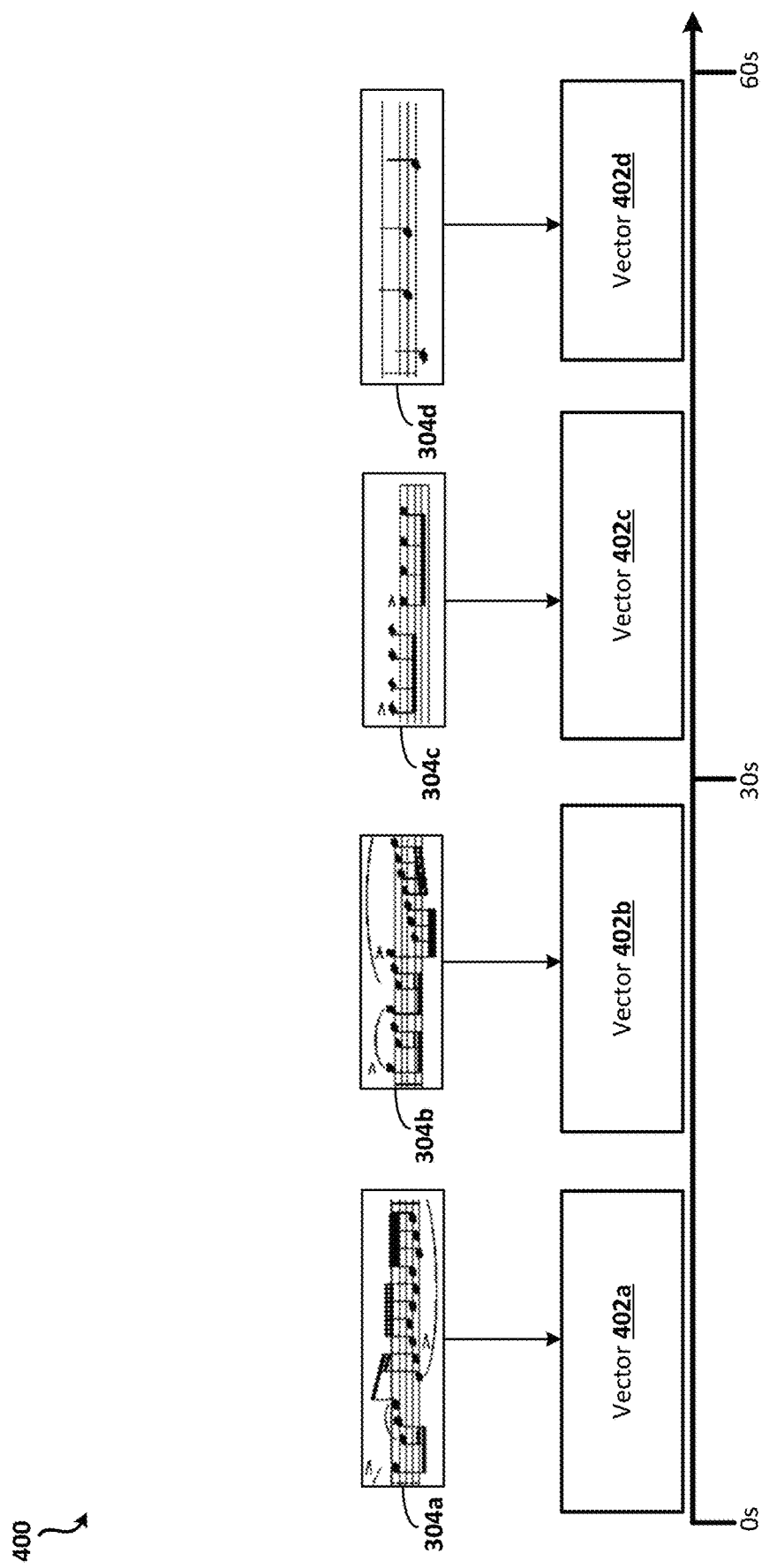
FIG. 4 shows an example diagram depicting vectors corresponding to music notes being generated accordance with the present disclosure.

FIG. 4 illustrates an example diagram 400 depicting vectors being generated based on music notes. As described above with regard to FIG. 3, a plurality of sets 304a-d of music notes may be generated. Each of the sets 304a-d of music notes may correspond to one of the segments 204a-d of the video 202. The vector generation model 119 may generate a plurality of vectors 402a-d. Each of the plurality of vectors 402a-d may correlate to a particular set 304a-d of music notes. For example, the vector 402a may correlate to the set 304a of music notes, the vector 402b may correlate to the set 304b of music notes, the vector 402c may correlate to the set 304c of music notes, and the vector 402d may correlate to the set 304d of music notes.

The vectors 402a-d generated by the vector generation model 119 may indicate at least one music feature of a piece of music audio associated with the corresponding set of music notes. For example, the vector 402a may indicate at least one music feature of a piece of music audio associated with the set 304a of music notes. The piece of music audio associated with the set 304a of music notes may be a music audio signal (e.g., (e.g., an actual audio signal, as opposed to just music notes) that could be generated based on the set 304a music notes. Likewise, the vector 402b may indicate at least one music feature of a piece of music audio associated with the set 304b of music notes, the vector 402c may indicate at least one music feature of a piece of music audio associated with the set 304c of music notes, and the vector 402d may indicate at least one music feature of a piece of music audio associated with the set 304d of music notes. The vectors 402a-d may be stored in the database 130 as vector data 131.

The vectors 402a-d may be consumable by the audio generation model 120. For example, the audio generation model 120 may not be able to read the music notes from the sets 304a-d of music notes. Thus, the vector generation model 119 may be utilized to translate or convert the sets 304a-d of music notes in a format that is readable or consumable by the audio generation model 120.

As described above, each vector 402a-d may indicate at least one music feature of the piece of music audio associated with the corresponding set of music notes 304a-d. For example, the at least one music feature may include a music style (e.g., music genre and/or mood), a bar structure, or a music instrument. A music genre may indicate whether the music audio associated with the corresponding set of music notes most closely resembles pop, rock, hip hop, country, etc. A music mood may indicate whether the music audio associated with the corresponding set of music notes has a particular energy (e.g., energetic, sad, slow, upbeat, etc.).

Referring back to FIG. 1, in an embodiment, at least one of the content service 112 or the client devices 104 comprise the audio generation model 120. The audio generation model 120 may be utilized, at least in part, to generate a plurality of pieces of music audio based at least in part on the vector data 131. The audio generation model 120 may receive, as input, the vector data 131 and output the plurality of pieces of music. Each piece of music from the plurality of pieces of music may correspond to a particular vector from the plurality of vectors generated by the vector generation model 119. As described above, each vector from the plurality of vectors corresponds to a particular set of music notes from the plurality of sets of music notes generated by the music note generation model 118. As also described above, each set of music notes from the plurality of music notes corresponds to a particular segment of the video. Thus, each piece of music from the plurality of pieces of music generated by the audio generation model 120 may correspond to a particular segment of the video. Each piece of music audio generated by the audio generated audio may be indicative of or reflect the music feature(s) of that particular piece of music audio as indicated by the corresponding vector. The pieces of music audio may be stored, for example, in a database 132 as music audio data 133.

In embodiments, to generate the plurality of pieces of music audio, the audio generation model 120 may utilize one or more templates. The one or more templates may be from among a plurality of templates per-stored in a database, such as the templates 129 in the database 128. Each of the plurality of templates may comprise an audio file. The audio file may be associated with at least a main track (e.g., chords) and/or base music that is associated with a particular style or type of music. Based on the vector data 131, the audio generation model 120 may determine one or more templates associated with the appropriate style or type of music. For example, the audio generation model 120 may retrieve, from the database 128, the one or more templates.

In embodiments, after the one or more templates have been retrieved, the audio generation model 120 may modify or add features to the template(s). For example, the audio generation model 120 may modify or add features to the template(s) based on the corresponding set of music notes generated earlier by the music note generation model 118. For example, the audio generation model 120 may generate a main melody, decorative melody, and/or instrument track based on the corresponding set of music notes. The audio generation model 120 may add the main melody, decorative melody, and/or instrument track to the audio file (e.g., main audio track) of the template(s) retrieved from the database.

By utilizing one or more templates, the music audio generation process is quick and does not require prohibitive amounts of computing power. For example, utilizing one or more templates to provide a base track for the music audio may prevent the need to generate a new audio track from scratch each time music audio content for a video is generated. As a result, users do not have to wait long periods of time for the music audio content to be generated. By contrast, if a new audio track had to be generated each time music audio content for a video is needed, this would require a large amount of computing resources and it would also require users to wait a longer amount of time for the music audio content to be generated.

In embodiments, the audio generation model 120 may, after generating the plurality of pieces of music audio, generating a final piece of music audio content for the video based at least in part on synthesizing the plurality of pieces of music audio. The final piece of music audio content for the video may match the motion, intensity, and transition in the video.

Figure 5:
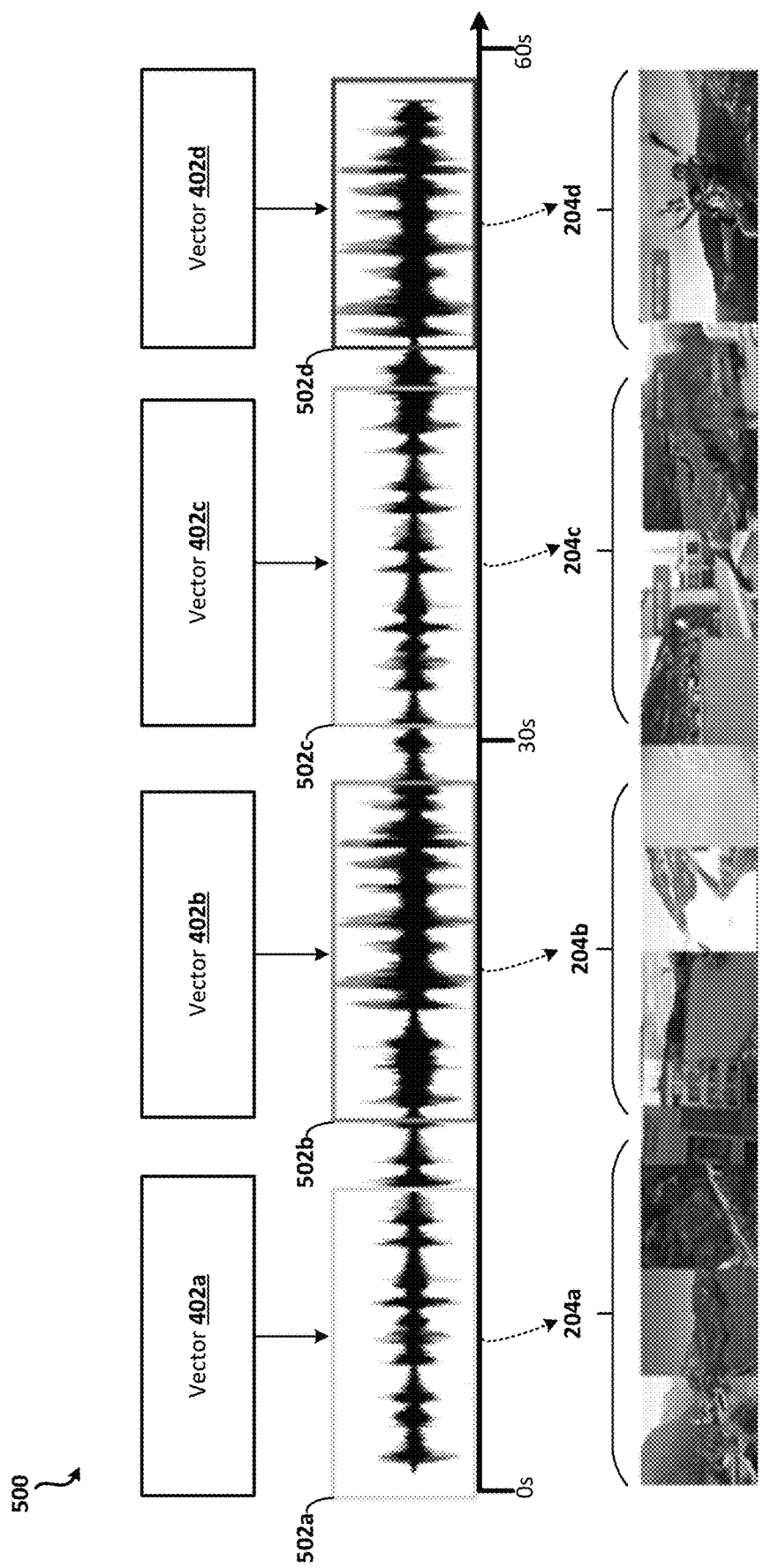
FIG. 5 shows an example diagram depicting pieces of music audio being generated based on vectors corresponding to music notes in accordance with the present disclosure.

FIG. 5 illustrates an example diagram 500 depicting pieces of music being generated base, at least in part, on vectors. As described above with regard to FIG. 4, a plurality of vectors 402a-d may be generated. Each of the vectors 402a-d may correspond to one of the sets 304a-d of music notes. Each set 304a-d of music notes may correspond to one of the segments 204a-d of the video 202. Thus, each of the vectors 402a-d may correspond to one of the segments 204a-d of the video. The audio generation model 120 may generate a plurality of pieces of music audio 502a-d based at least in part on the vectors 402a-d. Each of the plurality of pieces of music audio 502a-d may correlate to a vector 402a-d. For example, the piece of music audio 502a may correlate to the vector 402a, the piece of music audio 502b may correlate to the vector 402b, the piece of music audio 502c may correlate to the vector 402c, and the piece of music audio 502d may correlate to the vector 402d. If each of the vectors 402a-d correspond to one of the segments 204a-d of the video, the piece of music audio 502a may correlate to the segment 204a, the piece of music audio 502b may correlate to the segment 204b, the piece of music audio 502c may correlate to the segment 204c, and the piece of music audio 502d may correlate to the segment 204d. The pieces of music audio 502a-d may be synthesized to generate a final piece of music audio content for the video 202 that may match the motion, intensity, and transition in the video 202. Video-audio matching between the video 202 and the music audio content may be finetuned, for example, by applying video warping while generating the music audio content and/or adding the music audio content to the video 202.

Referring back to FIG. 1, in an embodiment, at least one of the content service 112 or the client devices 104 comprise a refinement model 121. The refinement model 121 may be utilized, at least in part, to refine or change the final piece of music audio content generated for a video. For example, it may be determined whether the user likes the generated music audio content, such as based on user input. For example, the refinement model 121 may receive an indication that the user likes the generated music audio content. If the refinement model 121 receives an indication that the user likes the generated music audio content, the generated music audio content may remain unchanged. Conversely, if the refinement model 121 receives an indication that the user does not like the generated music audio content, the refinement model 121 may present or cause display of a plurality of options. For example, the refinement model 121 may present or cause display of a plurality of options on an interface 108a-d of the content application 106. Each of the plurality of options may indicate a potential modification or change that may be made to the generated music audio content. The user may select (e.g., click) one or more of the plurality of options. The refinement model 121 may receive an indication of the one or more selected options. The refinement model 119 may update or modify the music audio content based on one or more options selected by the user. This process may be repeated until the user indicates that he or she likes the music audio content.

Figure 6:
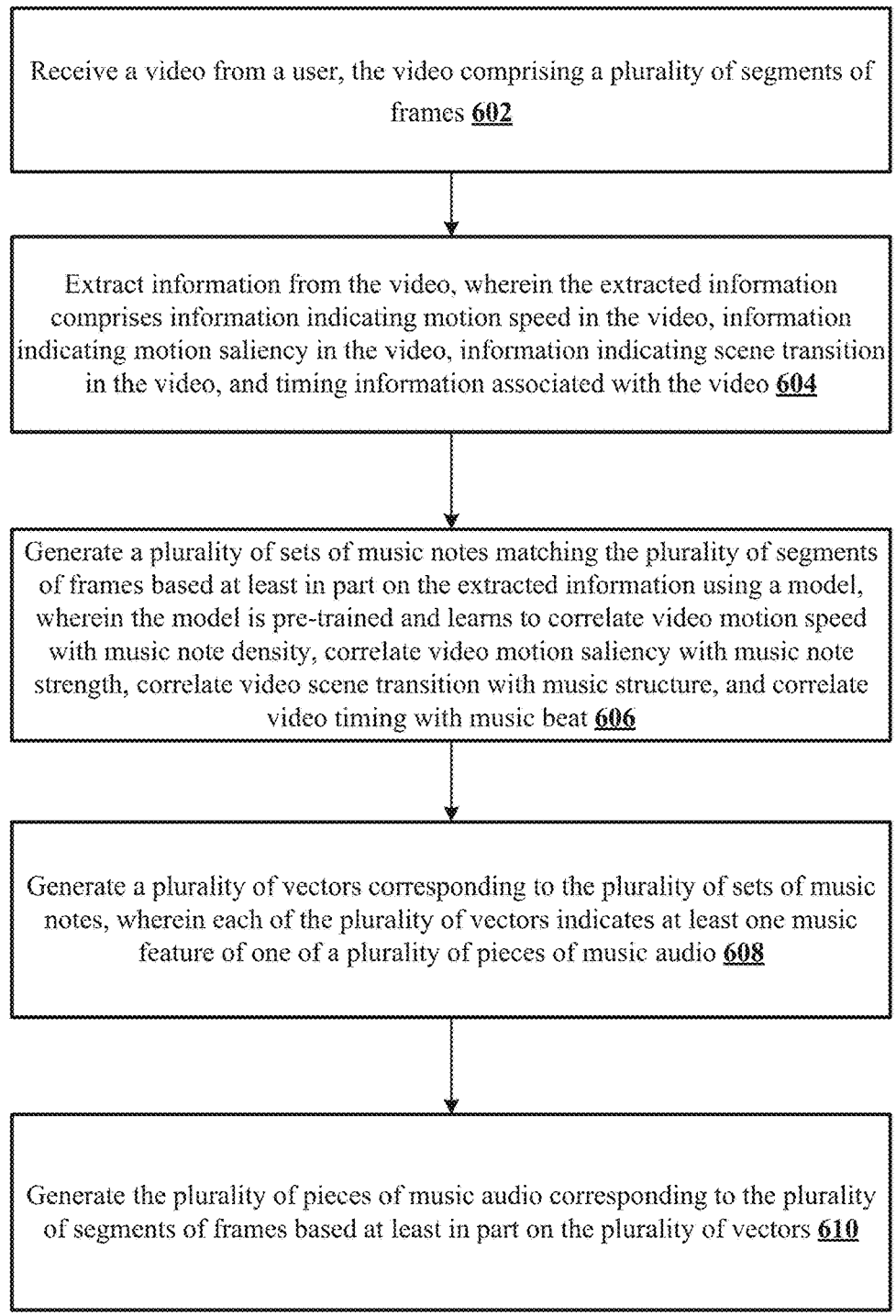
FIG. 6 shows an example process for automatically generating music audio for videos which may be in accordance with the present disclosure.

FIG. 6 illustrates an example process 600 performed by a content service (e.g., content service 112) and/or a client device (e.g., client device 104). The content service and/or the client device may perform the process 600 automatically and efficiently generate music audio content for videos. Although depicted as a sequence of operations in FIG. 6, those of ordinary skill in the art will appreciate that various embodiments may add, remove, reorder, or modify the depicted operations.

As described above, a user of a content service may create a video for distribution to other users of the content service. At 602, a video may be received from a user. The video may comprise a plurality of segments of frames. The video may have been created by the user. The video may not include any background music. The user may want background music that corresponds to the video to be automatically and efficiently generated.

To automatically generated music corresponding to the video frames, information may be extracted from the video frames. At 604, information may be extracted from the video. The extracted information comprises information indicating motion speed in the video, information indicating motion saliency in the video, information indicating scene transition in the video, and timing information associated with the video. For example, if a video depicts a man walking, information associated with how fast that man is walking, if/when he stops, etc. may be extracted from the video. Collectively, the extracted information associated with the video motion speed, video motion saliency, scene transitions, and/or timing, may be referred to as the extracted information.

A music note generation model may be utilized, at least in part, to automatically generate a set of music notes for each of the segments of the video frames. For example, the music note generation model may utilize the extracted information to automatically generate a set of music notes for each of the segments of the video frames. At 606, a plurality of sets of music notes matching the plurality of segments of frames based at least in part on the extracted information using a model (e.g., music note generation model). The model may be pre-trained and may have learned to correlate video motion speed with music note density, correlate video motion saliency with music note strength, correlate video scene transition with music structure, and correlate video timing with music beat. As described above, in embodiments, the model may be a compound-word transformer model that is trained on a large quantity of midi files (e.g., 3000 midi files).

A vector generation model may be utilized, at least in part, to automatically generate vectors corresponding to the plurality of sets of music notes. For example, the vector generation model may utilize the plurality of sets of music notes to automatically generate, for each of the plurality of sets of music notes, a vector. Each vector may indicate at least one music feature of a piece of music audio associated with the corresponding set of music notes.

At 608, a plurality of vectors corresponding to the plurality of sets of music notes may be generated. Each of the plurality of vectors may indicate at least one music feature of one of a plurality of pieces of music audio. For example, the at least one music feature may include a music style (e.g., music genre and/or mood), a bar structure, or a music instrument. A music genre may indicate whether the music audio associated with the corresponding set of music notes most closely resembles pop, rock, hip hop, country, etc. A music mood may indicate whether the music audio associated with the corresponding set of music notes has a particular energy (e.g., energetic, sad, slow, upbeat, etc.). The vectors may, for example, be in a format that is consumable by an audio generation model.

An audio generation model may be utilized, at least in part, to generate a plurality of pieces of music audio based at least in part on the plurality of vectors. The audio generation model may receive, as input, the vectors and output the plurality of pieces of music. At 610, the plurality of pieces of music audio corresponding to the plurality of segments of frames may be generated based at least in part on the plurality of vectors. Each piece of music from the plurality of pieces of music may correspond to a particular vector from the plurality of vectors. As described above, each vector from the plurality of vectors corresponds to a particular set of music notes from the plurality of sets of music notes generated by the music note generation model. As also described above, each set of music notes from the plurality of music notes corresponds to a particular segment of the video. Thus, each piece of music from the plurality of pieces of music generated by the audio generation model may correspond to a particular segment of the video. Each piece of music audio generated by the audio generated audio may be indicative of or reflect the music feature(s) of that particular piece of music audio as indicated by the corresponding vector.

Figure 7:
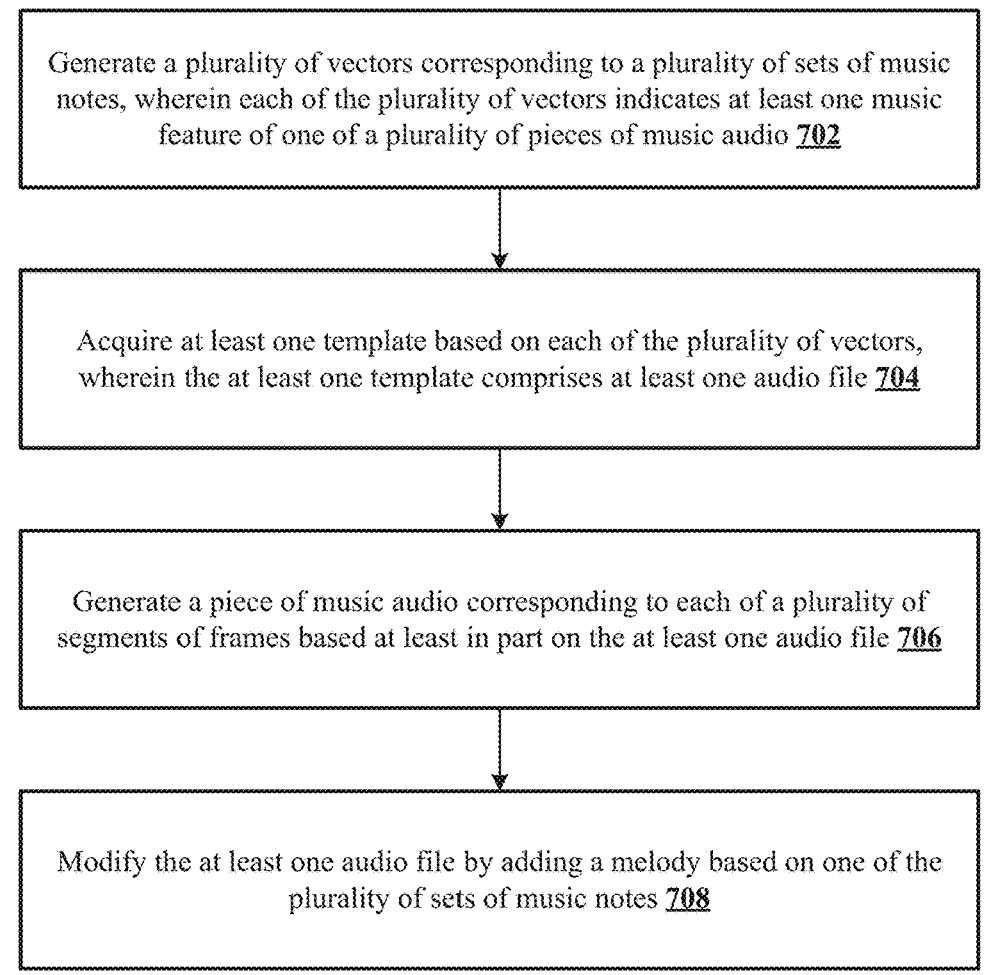
FIG. 7 shows another example process for automatically generating music audio for videos which may be in accordance with the present disclosure.

FIG. 7 illustrates an example process 700 performed by a content service (e.g., content service 112) and/or a client device (e.g., client device 104). The content service and/or the client device may perform the process 700 automatically generate music for videos. Although depicted as a sequence of operations in FIG. 7, those of ordinary skill in the art will appreciate that various embodiments may add, remove, reorder, or modify the depicted operations.

A vector generation model may be utilized, at least in part, to automatically generate vectors corresponding to a plurality of sets of music notes. For example, the vector generation model may utilize the plurality of sets of music notes to automatically generate, for each of the plurality of sets of music notes, a vector. Each vector may indicate at least one music feature of a piece of music audio associated with the corresponding set of music notes.

At 702, a plurality of vectors corresponding to the plurality of sets of music notes may be generated. Each of the plurality of vectors may indicate at least one music feature of one of a plurality of pieces of music audio. For example, the at least one music feature may include a music style (e.g., music genre and/or mood), a bar structure, or a music instrument. A music genre may indicate whether the music audio associated with the corresponding set of music notes most closely resembles pop, rock, hip hop, country, etc. A music mood may indicate whether the music audio associated with the corresponding set of music notes has a particular energy (e.g., energetic, sad, slow, upbeat, etc.). The vectors may, for example, be in a format that is consumable by an audio generation model.

To generate a plurality of pieces of music audio, an audio generation model may utilize one or more templates. The one or more templates may be from among a plurality of templates stored in a database. Each of the plurality of templates may comprise an audio file. The audio file may be associated with at least a main track (e.g., chords) and/or base music that is associated with a particular style or type of music. At 704, at least one template may be acquired based on each of the plurality of vectors. For example, based on the music features indicated by the plurality of vectors, the audio generation model may determine one or more templates associated with the appropriate style or type of music. Such template(s) may be retrieved from a database. At 706, a piece of music audio corresponding to each of a plurality of segments of frames may be generated based at least in part on the at least one audio file.

In embodiments, after the one or more templates have been retrieved and a piece of music audio corresponding to each of a plurality of segments of frames has been generated, the audio generation model may modify or add to the audio file. At 708, the at least one audio file may be modified by adding a melody based on one of the plurality of sets of music notes. For example, the audio generation model may generate a main melody, decorative melody, and/or instrument track based on the corresponding set of music notes. The audio generation model may add the main melody, decorative melody, and/or instrument track to the audio file (e.g., main audio track) of the template(s).

Figure 8:
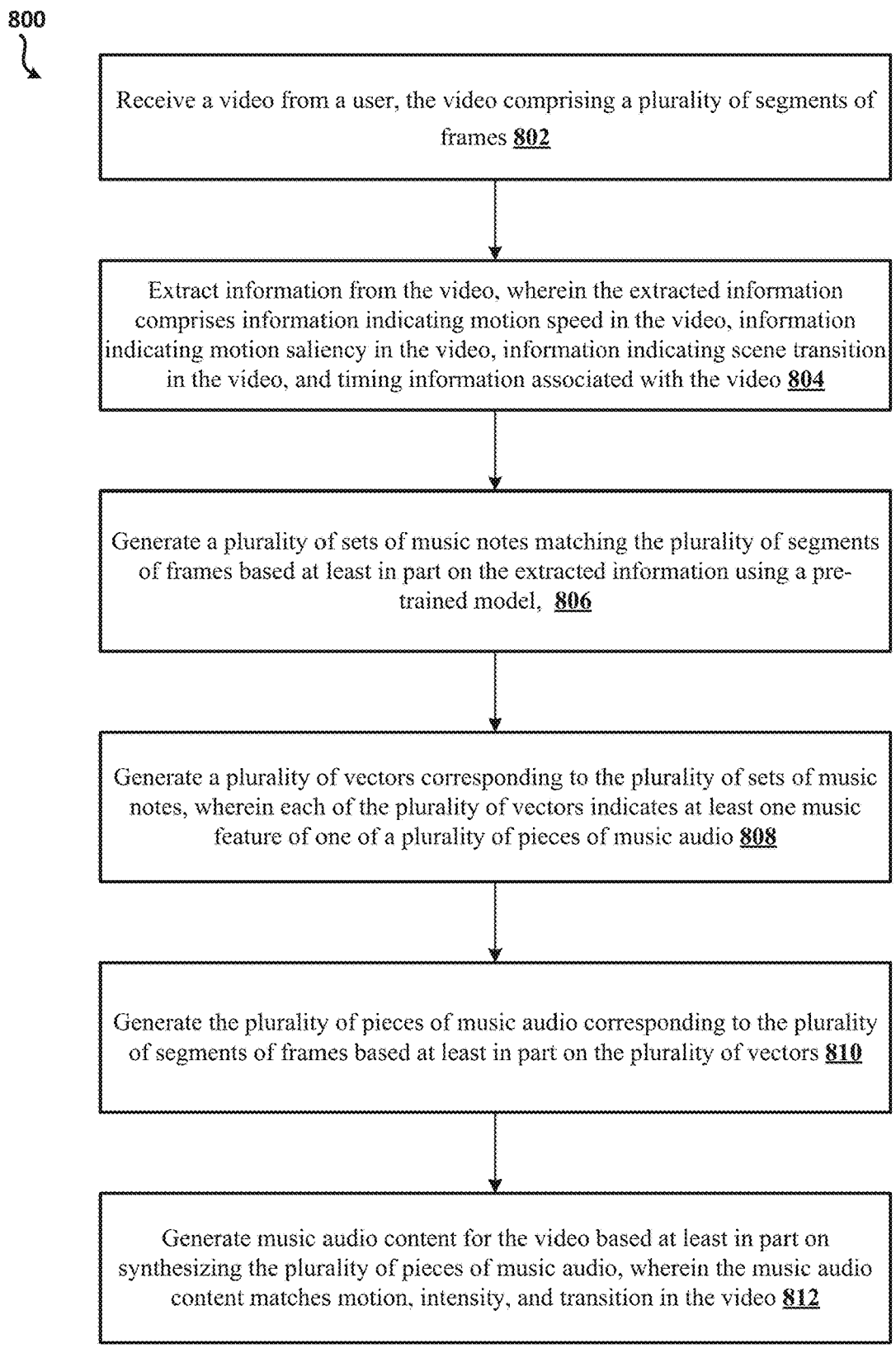
FIG. 8 shows another example process for automatically generating music audio for videos which may be in accordance with the present disclosure.

FIG. 8 illustrates an example process 800 performed by a content service (e.g., content service 112) and/or a client device (e.g., client device 104). The content service and/or the client device may perform the process 800 automatically generate music for videos. Although depicted as a sequence of operations in FIG. 8, those of ordinary skill in the art will appreciate that various embodiments may add, remove, reorder, or modify the depicted operations.

As described above, a user of a content service may create a video for distribution to other users of the content service. At 802, a video may be received from a user. The video may comprise a plurality of segments of frames. The video may have been created by the user. The video may not include any background music. The user may want background music that corresponds to the video to be automatically and efficiently generated.

To automatically generated music corresponding to the video frames, information may be extracted from the video frames. At 804, information may be extracted from the video. The extracted information comprises information indicating motion speed in the video, information indicating motion saliency in the video, information indicating scene transition in the video, and timing information associated with the video. For example, if a video depicts a man walking, information associated with how fast that man is walking, if/when he stops, etc. may be extracted from the video. Collectively, the extracted information associated with the video motion speed, video motion saliency, scene transitions, and/or timing, may be referred to as the extracted information.

A music note generation model may be utilized, at least in part, to automatically generate a set of music notes for each of the segments of the video frames. For example, the music note generation model may utilize the extracted information to automatically generate a set of music notes for each of the segments of the video frames. At 806, a plurality of sets of music notes matching the plurality of segments of frames based at least in part on the extracted information using a model (e.g., music note generation model). The model may be pre-trained and may learn to correlate video motion speed with music note density, correlate video motion saliency with music note strength, correlate video scene transition with music structure, and correlate video timing with music beat The model may be pre-trained and may have learned to correlate video motion speed with music note density, correlate video motion saliency with music note strength, correlate video scene transition with music structure, and correlate video timing with music beat. As described above, in embodiments, the model may be a compound-word transformer model that is trained on a large quantity of midi files (e.g., 3000 midi files).

A vector generation model may be utilized, at least in part, to automatically generate vectors corresponding to the plurality of sets of music notes. For example, the vector generation model may utilize the plurality of sets of music notes to automatically generate, for each of the plurality of sets of music notes, a vector. Each vector may indicate at least one music feature of a piece of music audio associated with the corresponding set of music notes.

At 808, a plurality of vectors corresponding to the plurality of sets of music notes may be generated. Each of the plurality of vectors may indicate at least one music feature of one of a plurality of pieces of music audio. For example, the at least one music feature may include a music style (e.g., music genre and/or mood), a bar structure, or a music instrument. A music genre may indicate whether the music audio associated with the corresponding set of music notes most closely resembles pop, rock, hip hop, country, etc. A music mood may indicate whether the music audio associated with the corresponding set of music notes has a particular energy (e.g., energetic, sad, slow, upbeat, etc.). The vectors may, for example, be in a format that is consumable by an audio generation model.

An audio generation model may be utilized, at least in part, to generate a plurality of pieces of music audio based at least in part on the plurality of vectors. The audio generation model may receive, as input, the vectors and output the plurality of pieces of music. At 810, the plurality of pieces of music audio corresponding to the plurality of segments of frames may be generated based at least in part on the plurality of vectors. Each piece of music from the plurality of pieces of music may correspond to a particular vector from the plurality of vectors. As described above, each vector from the plurality of vectors corresponds to a particular set of music notes from the plurality of sets of music notes generated by the music note generation model. As also described above, each set of music notes from the plurality of music notes corresponds to a particular segment of the video. Thus, each piece of music from the plurality of pieces of music generated by the audio generation model may correspond to a particular segment of the video. Each piece of music audio generated by the audio generated audio may be indicative of or reflect the music feature(s) of that particular piece of music audio as indicated by the corresponding vector. At 812, music audio content may be generated for the video based at least in part on synthesizing the plurality of pieces of music audio. The music audio content may match motion, intensity, and transition in the video.

Figure 9:
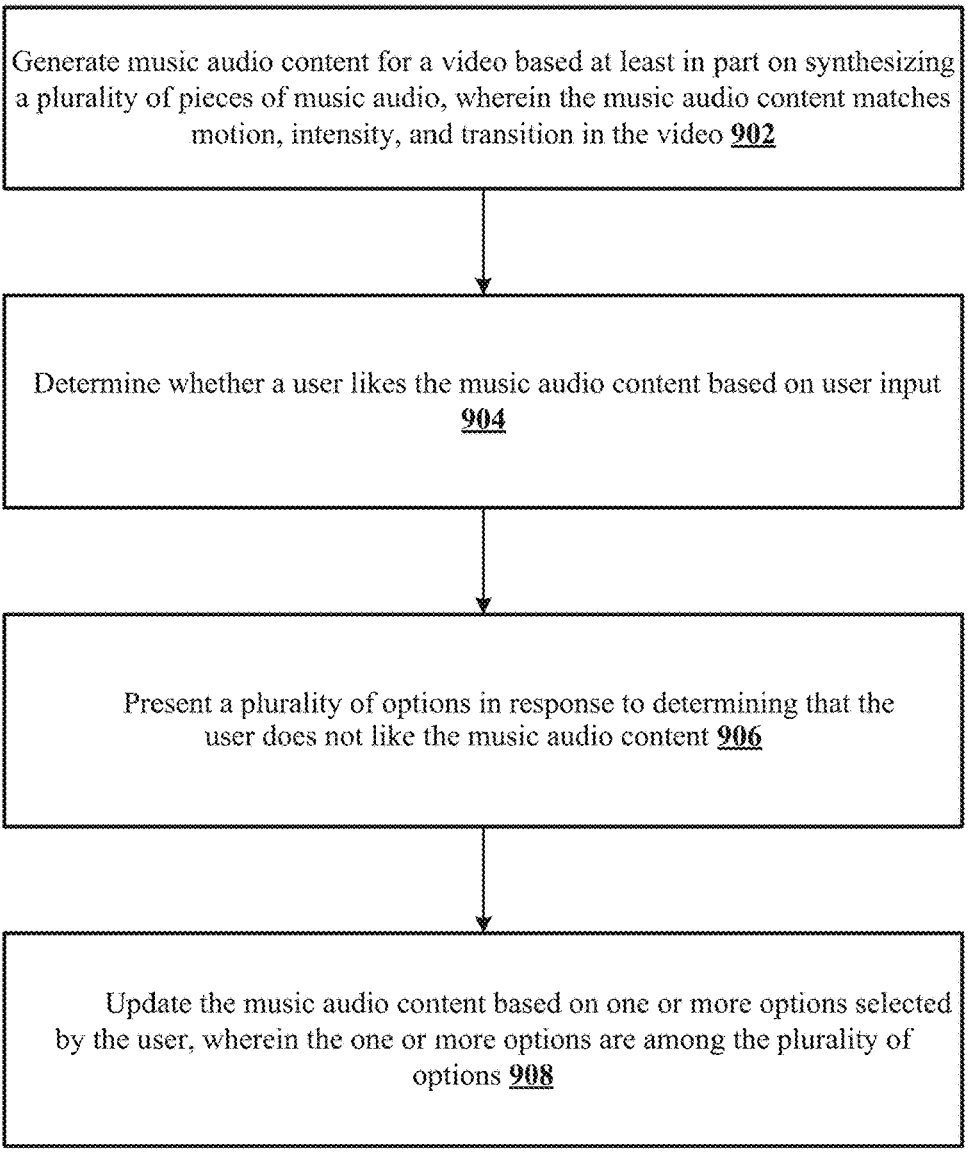
FIG. 9 shows another example process for automatically generating music audio for videos which may be in accordance with the present disclosure.

FIG. 9 illustrates an example process 900 performed by a content service (e.g., content service 112) and/or a client device (e.g., client device 104). The content service and/or the client device may perform the process 900 automatically generate music for videos. Although depicted as a sequence of operations in FIG. 9, those of ordinary skill in the art will appreciate that various embodiments may add, remove, reorder, or modify the depicted operations.

As described above, music audio content may be generated for the video. At 902, music audio content may be generated for a video based at least in part on synthesizing a plurality of pieces of music audio. The music audio content may match motion, intensity, and transition in the video.

It may be determined whether the user likes the generated music audio content, such as based on user input. At 904, it may be determined whether a user likes the music audio content based on user input. For example, an indication that the user likes the generated music audio content may be received. If an indication that the user likes the generated music audio content, the generated music audio content may remain unchanged. Conversely, an indication that the user does not like the generated music audio content may be received. At 906, a plurality of options may be presented in response to determining that the user does not like the music audio content. For example, the plurality of options may be presented or displayed on an interface of a content application.

At 908, the music audio content may be updated based on one or more options selected by the user, wherein the one or more options are among the plurality of options Each of the plurality of options may indicate a potential modification or change that may be made to the generated music audio content. The user may select (e.g., click) one or more of the plurality of options. An indication of the one or more selected options may be received. The music audio content may be updated, modified, or refined based on one or more options selected by the user. This process may be repeated until the user indicates that he or she likes the music audio content.

Figure 10:
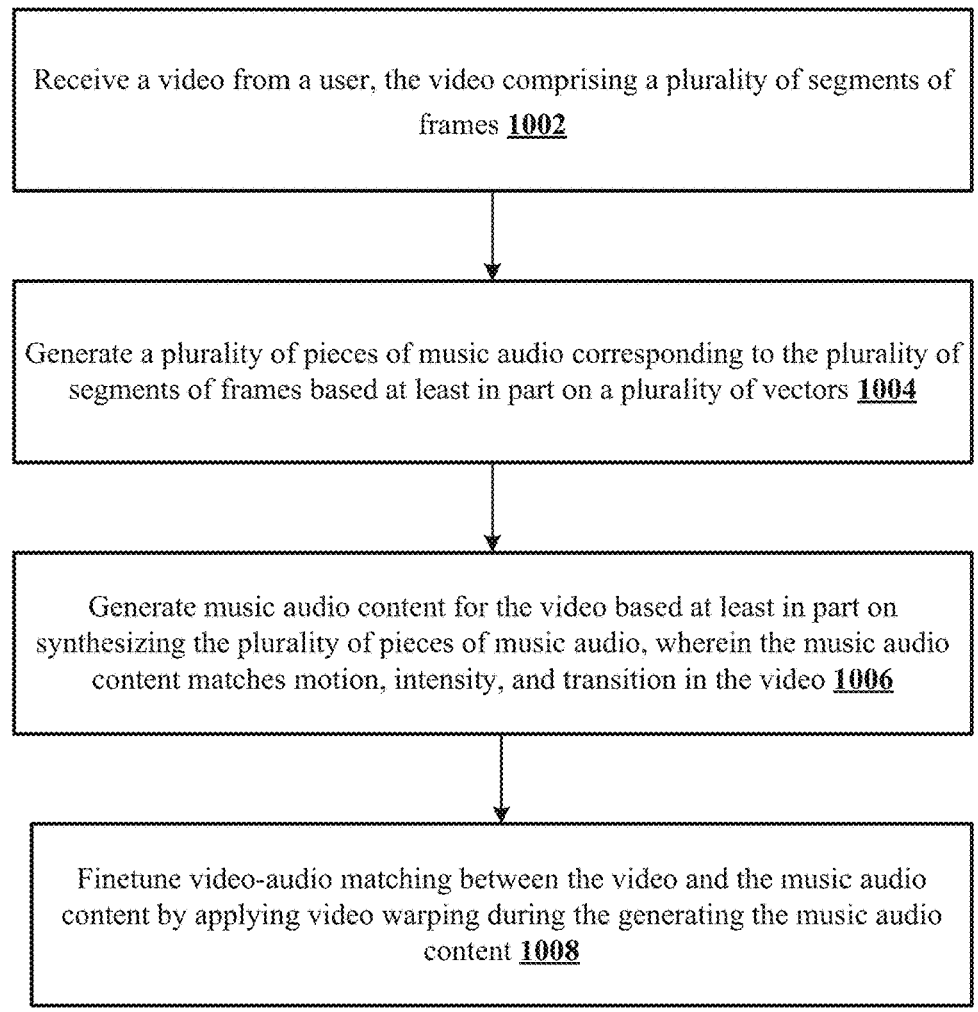
FIG. 10 shows another example process for automatically generating music audio for videos which may be in accordance with the present disclosure.

FIG. 10 illustrates an example process 1000 performed by a content service (e.g., content service 112) and/or a client device (e.g., client device 104). The content service and/or the client device may perform the process 1000 automatically generate music for videos. Although depicted as a sequence of operations in FIG. 10, those of ordinary skill in the art will appreciate that various embodiments may add, remove, reorder, or modify the depicted operations.

As described above, a user of a content service may create a video for distribution to other users of the content service. At 1002, a video may be received from a user. The video may comprise a plurality of segments of frames. The video may have been created by the user. The video may not include any background music. The user may want background music that corresponds to the video to be automatically and efficiently generated.

An audio generation model may be utilized, at least in part, to generate a plurality of pieces of music audio based at least in part on a plurality of vectors. The audio generation model may receive, as input, the vectors and output the plurality of pieces of music. At 1004, a plurality of pieces of music audio corresponding to the plurality of segments of frames may be generated based at least in part on a plurality of vectors. Each piece of music from the plurality of pieces of music may correspond to a particular vector from the plurality of vectors. As described above, each vector from the plurality of vectors corresponds to a particular set of music notes from a plurality of sets of music notes generated by the music note generation model. As also described above, each set of music notes from the plurality of music notes corresponds to a particular segment of the video. Thus, each piece of music from the plurality of pieces of music may correspond to a particular segment of the video. Each piece of music audio may be indicative of or reflect the music feature(s) of that particular piece of music audio as indicated by the corresponding vector.

At 1006, music audio content may be generated for the video based at least in part on synthesizing the plurality of pieces of music audio. The music audio content may match motion, intensity, and transition in the video. Video-audio matching between the video and the music audio content may be finetuned, for example, by applying video warping while generating the music audio content and/or adding the music audio content to the video. At 1008, video-audio matching between the video and the music audio content may be finetuned by applying video warping during the generating the music audio content.

Figure 11:
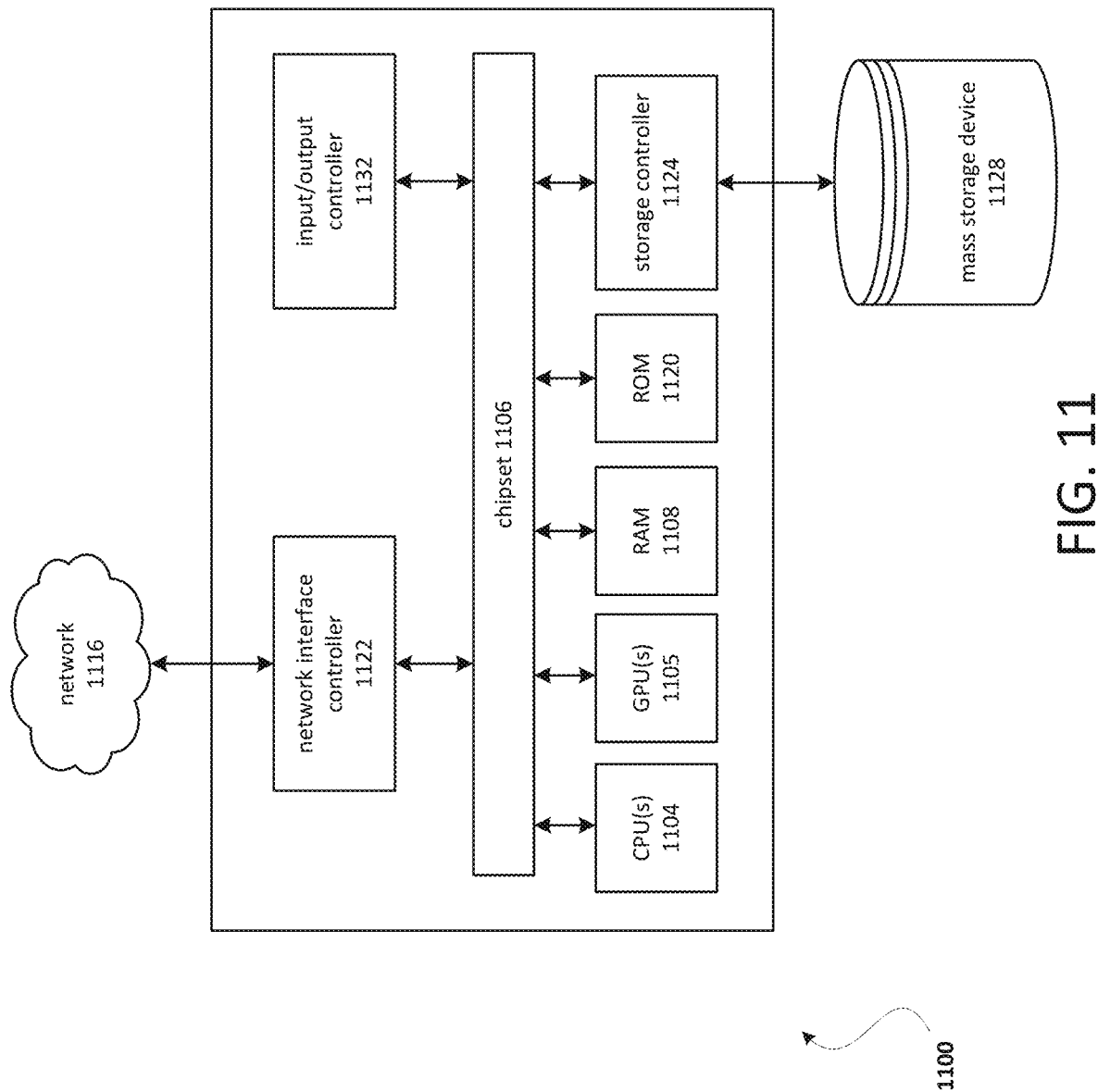
FIG. 11 shows an example computing device which may be used to perform any of the techniques disclosed herein.

FIG. 11 illustrates a computing device that may be used in various aspects, such as the services, networks, modules, and/or devices depicted in FIG. 1. With regard to the example architecture of FIG. 1, any or all of the model(s), the server, the content service, and client devices may each be implemented by one or more instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s). The GPU(s) may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random-access memory (RAM) 1108 used as the main memory in the computing device 1100. The chipset 1106 may further provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. The mass storage device 1128 may comprise a management component 1110. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on the mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may further read information from the mass storage device 1128 by detecting the physical states or characteristics of one or more particular locations within the physical storage units.

In addition to the mass storage device 1128 described above, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described above. The computing device 1100 may have access to computer-readable storage media storing computer-executable instructions, which, when executed by the computing device 1100, may perform the methods described herein.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of automatically and efficiently generating music audio content for videos, comprising:
   receiving a video from a user, the video comprising a plurality of segments of frames;
   extracting information from the video, wherein the extracted information comprises information indicating motion speed in the video, information indicating motion saliency in the video, information indicating scene transition in the video, and timing information associated with the video; and
   generating a plurality of sets of music notes matching the plurality of segments of frames based at least in part on the extracted information using a model, wherein the model is pre-trained and learns to correlate video motion speed with music note density, correlate video motion saliency with music note strength, correlate video scene transition with music structure, and correlate video timing with music beat;
   generating, by a vector generation model, a plurality of vectors utilizing the plurality of sets of music notes, wherein each of the plurality of vectors indicates at least one music feature of one of a plurality of pieces of music audio, and wherein the vector generation model is configured to determine music characteristics based on music notes; and
   generating the plurality of pieces of music audio corresponding to the plurality of segments of frames by inputting the plurality of vectors into an audio generation model, wherein the generating the plurality of pieces of music audio corresponding to the plurality of segments of frames further comprises:
      determining at least one template based on each of the plurality of vectors by the audio generation model,
      acquiring the at least one template from a pre-stored database by the audio generation model, wherein the at least one template comprises at least one audio file, and
      generating a piece of music audio corresponding to each of the plurality of segments of frames based at least in part on the at least one template by the audio generation model.

2. The method of claim 1,
   wherein the pre-stored database comprises a plurality of templates, and each of the plurality of templates comprises an audio file with a particular music feature.

3. The method of claim 1, wherein the generating a piece of music audio corresponding to each of the plurality of segments of frames based at least in part on the at least one template further comprises:
   modifying the at least one template by adding a melody based on one of the plurality of sets of music notes.

4. The method of claim 1, wherein the at least one music feature of one of the plurality of pieces of music audio comprises at least one of music style, bar structure, or music instrument.

5. The method of claim 1, further comprising:
   generating music audio content for the video based at least in part on synthesizing the plurality of pieces of music audio, wherein the music audio content matches motion, intensity, and transition in the video.

6. The method of claim 5, further comprising:
   determining whether the user likes the music audio content based on user input.

7. The method of claim 6, further comprising:
   presenting a plurality of options in response to determining that the user does not like the music audio content; and
   updating the music audio content based on one or more options selected by the user, wherein the one or more options are among the plurality of options.

8. The method of claim 5, further comprising:
   finetuning video-audio matching between the video and the music audio content by applying video warping during the generating the music audio content.

9. A system of automatically and efficiently generating music audio content for videos, comprising:
   at least one processor; and
   at least one memory communicatively coupled to the at least one processor and comprising computer-readable instructions that upon execution by the at least one processor cause the at least one processor to perform operations comprising:
   receiving a video from a user, the video comprising a plurality of segments of frames;
   extracting information from the video, wherein the extracted information comprises information indicating motion speed in the video, information indicating motion saliency in the video, information indicating scene transition in the video, and timing information associated with the video; and
   generating a plurality of sets of music notes matching the plurality of segments of frames based at least in part on the extracted information using a model, wherein the model is pre-trained and learns to correlate video motion speed with music note density, correlate video motion saliency with music note strength, correlate video scene transition with music structure, and correlate video timing with music beat;
   generating, by a vector generation model, a plurality of vectors utilizing the plurality of sets of music notes, wherein each of the plurality of vectors indicates at least one music feature of one of a plurality of pieces of music audio, and wherein the vector generation model is configured to determine music characteristics based on music notes; and
   generating the plurality of pieces of music audio corresponding to the plurality of segments of frames by inputting the plurality of vectors into an audio generation model, wherein the generating the plurality of pieces of music audio corresponding to the plurality of segments of frames further comprises:
      determining at least one template based on each of the plurality of vectors by the audio generation model,
      acquiring the at least one template from a pre-stored database by the audio generation model, wherein the at least one template comprises at least one audio file, and generating a piece of music audio corresponding to each of the plurality of segments of frames based at least in part on the at least one template by the audio generation model.

10. The system of claim 9, wherein the pre-stored database comprises a plurality of templates, and each of the plurality of templates comprises an audio file with a particular music feature.

11. The system of claim 9, wherein the generating a piece of music audio corresponding to each of the plurality of segments of frames based at least in part on the at least one template further comprises:
modifying the at least one template by adding a melody based on one of the plurality of sets of music notes.

12. The system of claim 9, wherein the at least one music feature of one of the plurality of pieces of music audio comprises at least one of music style, bar structure, or music instrument.

13. The system of claim 9, the operations further comprising:
generating music audio content for the video based at least in part on synthesizing the plurality of pieces of music audio, wherein the music audio content matches motion, intensity, and transition in the video.

14. A non-transitory computer-readable storage medium, storing computer-readable instructions that upon execution by a processor cause the processor to implement operations comprising:
receiving a video from a user, the video comprising a plurality of segments of frames;
extracting information from the video, wherein the extracted information comprises information indicating motion speed in the video, information indicating motion saliency in the video, information indicating scene transition in the video, and timing information associated with the video; and
generating a plurality of sets of music notes matching the plurality of segments of frames based at least in part on the extracted information using a model, wherein the model is pre-trained and learns to correlate video motion speed with music note density, correlate video motion saliency with music note strength, correlate video scene transition with music structure, and correlate video timing with music beat;
generating, by a vector generation model, a plurality of vectors utilizing the plurality of sets of music notes, wherein each of the plurality of vectors indicates at least one music feature of one of a plurality of pieces of music audio, and wherein the vector generation model is configured to determine music characteristics based on music notes; and
generating the plurality of pieces of music audio corresponding to the plurality of segments of frames by inputting the plurality of vectors into an audio generation model, wherein the generating the plurality of pieces of music audio corresponding to the plurality of segments of frames further comprises:
determining at least one template based on each of the plurality of vectors by the audio generation model,
acquiring the at least one template from a pre-stored database by the audio generation model, wherein the at least one template comprises at least one audio file, and
generating a piece of music audio corresponding to each of the plurality of segments of frames based at least in part on the at least one template by the audio generation model.

15. The non-transitory computer-readable storage medium of claim 14, wherein the pre-stored database comprises a plurality of templates, and each of the plurality of templates comprises an audio file with a particular music feature.

16. The non-transitory computer-readable storage medium of claim 14, wherein the generating a piece of music audio corresponding to each of the plurality of segments of frames based at least in part on the at least one template further comprises:
modifying the at least one template by adding a melody based on one of the plurality of sets of music notes.

17. The non-transitory computer-readable storage medium of claim 14, the operations further comprising:
generating music audio content for the video based at least in part on synthesizing the plurality of pieces of music audio, wherein the music audio content matches motion, intensity, and transition in the video.

* * * * *